Figure 1:
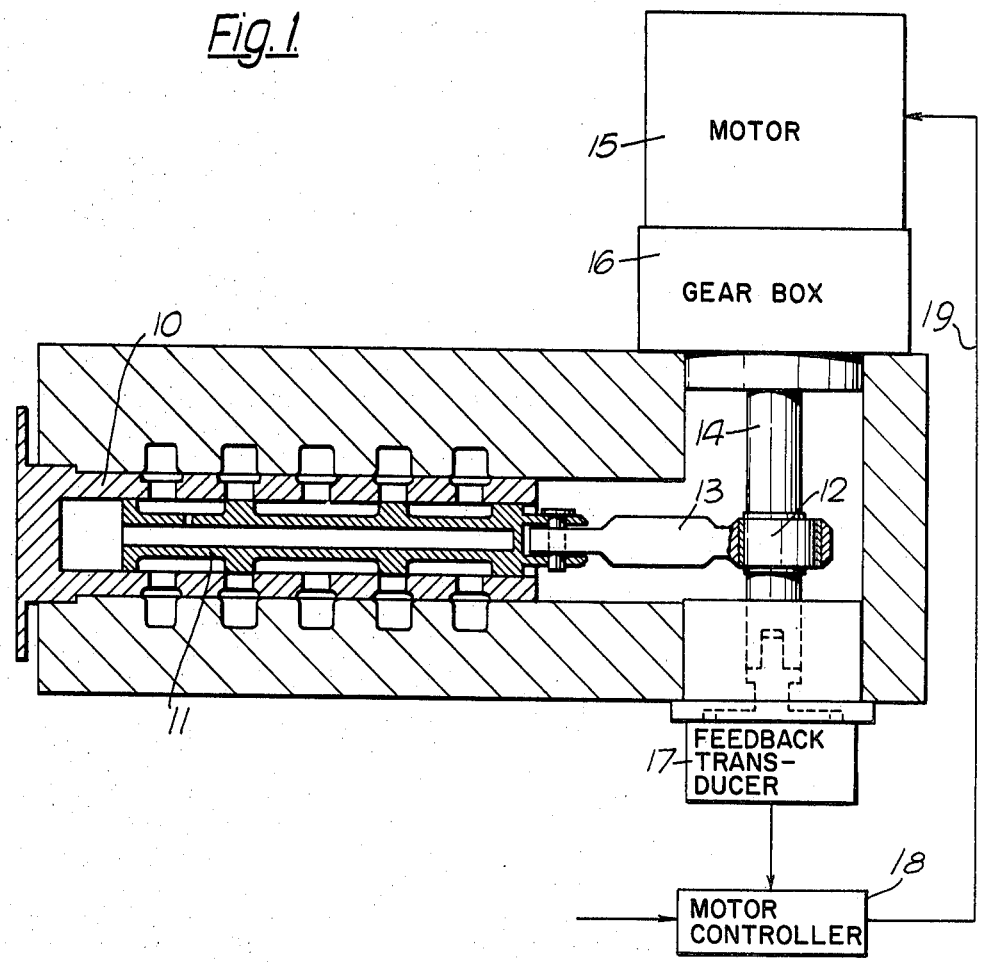

United States Patent [19]

Coles

[11] 4,285,496
[45] Aug. 25, 1981

[54] ELECTRO-HYDRAULIC SYSTEMS

[75] Inventor: Ernest F. Coles, Hertfordshire, England

[73] Assignee: Hawker Siddeley Dynamics Engr., Ltd., Hatfield, England

[21] Appl. No.: 41,496

[22] Filed: May 22, 1979

Related U.S. Application Data

[62] Division of Ser. No. 841,442, Oct. 12, 1977, Pat. No. 4,190,081.

[30] Foreign Application Priority Data

Oct. 14, 1976 [GB] United Kingdom ............... 42695/76

[51] Int. Cl.³ ....................... F16K 31/05; F16D 11/10
[52] U.S. Cl. ..................................... 251/130; 74/548; 74/625; 192/89 A; 192/93 R
[58] Field of Search ..................... 251/130, 14; 74/625, 74/548; 192/93 R, 89 A

[56] References Cited

U.S. PATENT DOCUMENTS

| | | | |
|---|---|---|---|
| 1,931,655 | 10/1933 | Haseltine | 192/89 A |
| 3,408,035 | 10/1968 | Lathrop et al. | 251/130 X |
| 3,515,250 | 6/1970 | Cantalupo | 251/130 X |

FOREIGN PATENT DOCUMENTS

| | | | |
|---|---|---|---|
| 1236293 | 3/1967 | Fed. Rep. of Germany | 251/130 |
| 689211 | 3/1953 | United Kingdom | 251/130 |

*Primary Examiner*—Arnold Rosenthal
*Attorney, Agent, or Firm*—Howard L. Rose

[57] ABSTRACT

A valve assembly for regulating the amount or pressure of hydraulic fluid supplied to a hydraulically operated machine system comprises a progressively movable valve member, especially a rectilinearly-moving valve spool controlling ports in a ported valve sleeve, a motive power unit, such as an electric stepper motor, disengageable speed-reducing coupling means, including a worm and worm wheel, to convert the rotary output motion of the motor into valve motion, a valve member position feedback transducer, and an electrical controller controlling the motor in response to input command signals and the feedback signal. A manual override control lever is provided for moving the valve member when the power drive is disengaged.

6 Claims, 2 Drawing Figures

ELECTRO-HYDRAULIC SYSTEMS

CROSS-REFERENCE TO RELATED APPLICATION

This application is a division of application Ser. No. 841,442, filed Oct. 12, 1977, now U.S. Pat. No. 4,190,081.

This invention relates to the control of fluid flow in a hydraulic control system and in particular the invention is concerned with providing means enabling reliable control of the movement of a valve to be achieved in a contaminated environment.

The invention further seeks to provide a reliable interface between an electric/electronic controller and a hydraulic system. In the following discussion and description emphasis is placed upon the application of the invention to mining equipment. It is to be understood, however, that the invention is not so limited in application and could be applied to other uses.

With the increasing emphasis on automation in the mining industry and the increasing usage of computers and microprocessors to provide proportional and remote control of mining machines and equipment, a requirement exists for a reliable interface between the electric/electronic controllers and the machine hydraulic systems.

In electro-hydraulic systems where a high standard of component and fluid cleanliness can be achieved and maintained, the interface requirement can be met by a standard electrohydraulic servo valve. Such valves, however, employ spools moving in sleeves with very small diametrical clearance and movement of the spool to direct the fluid flow is dependent on very small differential pressures acting on the spool. Because of the low forces available contaminant particles between the spool and sleeve will cause the spool to lock.

If reliable operation is to be achieved in systems using these valves the level of contamination that can be tolerated is very low. Filtration of 10 microns or better is essential and particular care has to be taken in topping-up fluid and monitoring its contamination level. In a mining environment 10 micron filter elements would require replacing too frequently to be practical and in any event do not protect the systems downstream of the valve. Even the process of changing the element could introduce contamination, as could topping up the system, unless done with special equipment.

With coal mining equipment the fluid contamination problem is further aggravated by the fact that to get the machinery to its working location it almost invariably has to be dismantled on the surface and re-assembled underground. Since the initial build, cleaning and flushing of hydraulic servo systems, even in good workshop conditions, has to be done with great care if contamination of the fluid is to be avoided, then re-assembly underground would present major problems.

Further problems can arise from contamination generated within the system, particularly from flexible hoses between the servo valve and the hydraulic cylinders or motors. Not only do the hoses and prime movers generate contaminant particles but the fact that the flow is bi-directional makes filtration difficult.

The most common cause of failure of electro-hydraulic servo valves used with contaminated fluid results from the entry of contaminant particles between the valve spool and sleeve preventing the movement of the spool in response to the small differential forces typically available in this type of valve.

According to the present invention, there is provided an electro-hydraulic servo valve assembly for regulating the amount or pressure of hydraulic fluid supplied to a hydraulically-operated machine system, comprising a progressively movable valve member, a motive power unit, means coupling the drive of the motive power unit to the valve member, a valve member position transducer supplying a feedback signal representative of the instantaneous position of the valve member, and electrical control means controlling the energisation of the motive power unit in accordance with input command signals and the feedback signal, and wherein the coupling means includes disengageable elements, and a manual lever is provided for moving the valve member when the power drive is disengaged.

Forces equivalent to those available on manual control valves used in systems liable to fluid contamination, e.g. mining and similar machines, will be used.

While spool valves are referred to in this description, the same principle can be applied to other types of device used to control the flow of hydraulic fluid, e.g. rotary sleeve valves, rotary plate valves, sliding plate valves.

Figure 2:
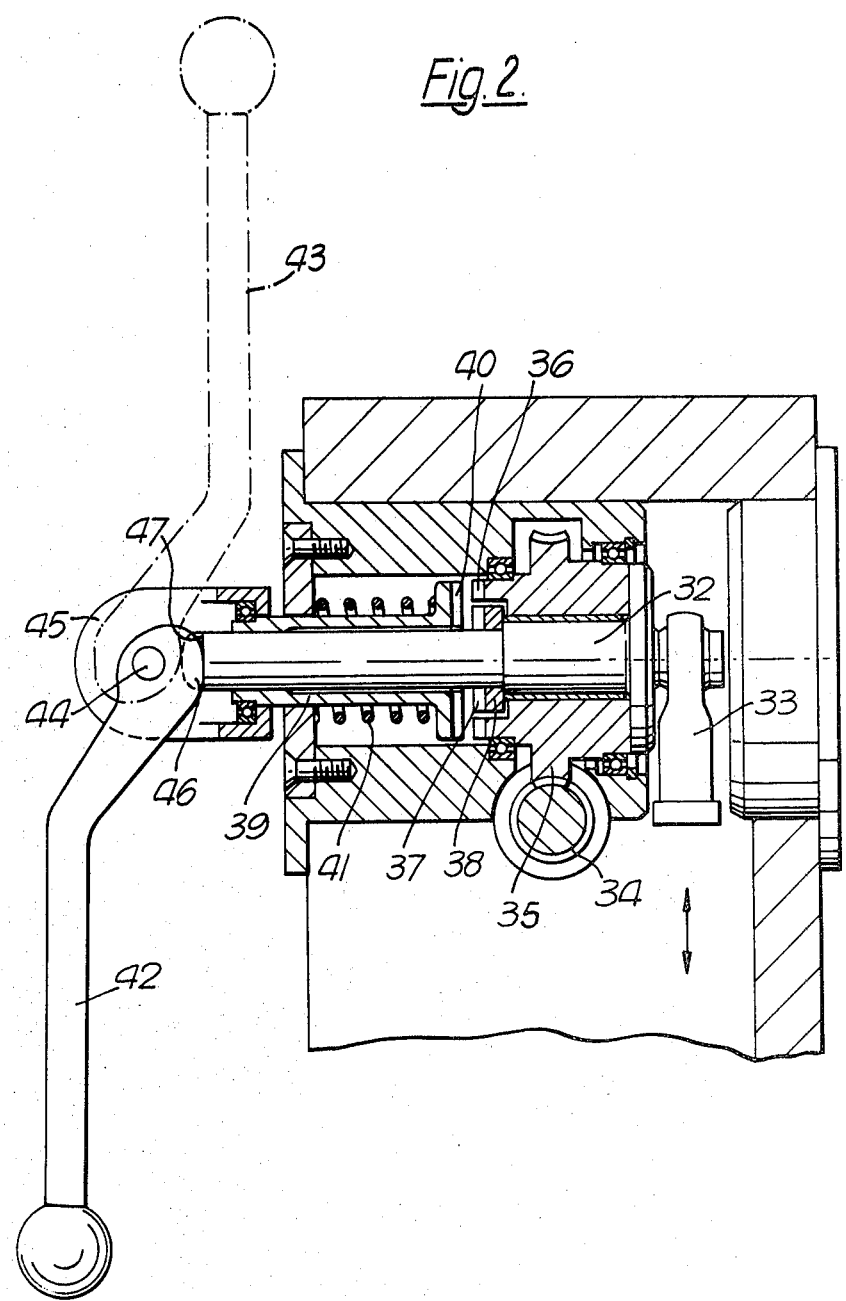

FIG. 1 shows a schematic arrangement of a mechanical drive coupled to a valve spool the movement of which will control the direction of fluid flow in a machine system, and FIG. 2 shows an embodiment of the invention including a worm drive arrangement with a manual override lever.

In FIG. 1, the valve spool 11 sliding in a valve sleeve 10 is moved rectilinearly by an eccentric 12 acting through a coupling link 13. The eccentric 12 is mounted on a shaft 14 driven by an electric motor 15 through a speed-reduction gearbox 16. This permits a very high effective gear ratio providing a high spool driving force from a small motor. The arrangement enables a system to be controlled from intrinsically safe electrical signals. A spool position feedback transducer 17 is also driven by the shaft 14.

A motor controller 18 which may be a differential amplifier, receives input position command signals and signals from feedback transducer 17. A signal indicative of the difference between the two signals is applied to motor 15 via lead 19 to drive the motor 15 in one or the other directions to minimize the difference between the signals.

In FIG. 2, the valve spool (not shown) is moved by a shaft 32 operating a crank 33. A motor-driven worm 34 meshes with a worm wheel 35 the hub of which is loose on the shaft 32. One end of the worm wheel 35 is provided with a ring of drive teeth 36 that surround another ring of drive teeth 37 of a shoulder 38 on the shaft 32, and a sleeve 39 slidable along the shaft has a further ring of teeth 40 which can be brought into simultaneous engagement with the teeth 36 on the worm wheel and the teeth 37 on the shaft 32 thereby coupling the motor drive to the shaft. A spring 41 normally urges the sleeve 39 into the engaged position.

A manual override lever 42 has an inoperative position, shown at 43, and an operative position, shown in full lines, in which latter it disengages the motor drive and engages with the shaft 32 so that the spool valve can be operated manually. The lever 42 is pivotally mounted at 44 on a trunnion 45 attached to the sleeve 39 and surrounding the end of the shaft 32. When the lever 42 is swung about its pivot 44 from the inoperative position 43 to the operative position, a cam portion 46 on the lever engages in a slot 47 in the end of the shaft 32 and thereby couples the lever to the shaft, at the same time forcing the trunnion 45 and sleeve 39 to the left, as seen in the drawing, against the action of the spring 41 so that the drive teeth 36, 37, 40 are disengaged.

The lever 42 will only engage with the slot 47 in the spool drive shaft 32 in one relative angular position of the shaft and lever, thereby ensuring that the manual lever positions will always provide the same system responses.

The principle and means described may also be applied to control the generation, as well as the direction, of flow in a hydraulic or hydrostatic system where the means of generating the flow and determining the amount and direction of flow is a swash plate pump. In this case the movement and position of the swash plate can be controlled by operation of the type of arrangement shown in the drawings, to direct the flow of a charge pump to the piston which governs the angle of the swash plate and hence controls the amount and direction of fluid flow in the main machine system.

Where an axial piston device is used as a motor whose rotation is controlled by the angle of a swash plate, a motor-driven valve as described herein can be used to control the swash angle, either by controlling the main system fluid flow into the swash plate actuator pistons, or by controlling a separately generated fluid flow for the same purpose.

The electro-hydraulic servo valve may be used to control position or speed of movement, or both speed and position, of machines or parts of machines, feedback transducers appropriate to the requirements being incorporated.

A system designed to control a valve driven by a stepper motor can be arranged so that when a command/feedback error exists it will output a number of drive pulses which will be related to the magnitude of the error and switched so that the direction of rotation which results will cause movement of the valve spool such that it takes up a predetermined position directly related to the error, e.g. at zero error the spool will take up a null position.

The spool position feedback information may be derived either directly from a spool position feedback transducer, or indirectly from a stepper drive output pulse count system.

I claim:

1. Mechanical drive means for valve spool comprising
    a rotary shaft,
    a worm wheel rotatable on said shaft, a motor-driven worm meshing with said worm wheel,
    coupling means converting rotary motion of said shaft to recilinear valve spool motion,
    a clutch sleeve surrounding said shaft and slidable axially along said shaft to clutch said shaft to and unclutch said shaft from said worm wheel,
    spring means urging said clutch sleeve into clutching engagement,
    a trunnion mounted on an end of said clutch sleeve, and
    a manual operation mounted on said trunnion beyond one end of said shaft for rotating said shaft when said shaft is unclutched from said worm wheel,
    said handle being pivotally mounted to swing on said trunnion about an axis at right angles to said shaft axis from a first position in which said handle is disconnected from said shaft to a second position in which said handle is engaged with said shaft to rotate it, and
    cam means being provided on said handle whereby said clutch sleeve is cammed axially out of clutching engagement against the action of said spring when said handle is swung into said second position.

2. Drive means according to claim 1, wherein the end of said shaft has a slot in which said handle engages when swung into said second position, whereby said handle and said shaft can only be mutually engaged in one relative angular position of said handle and said shaft about the shaft axis.

3. Drive means according to claim 1, wherein said worm wheel bears a first ring of clutch teeth,
    said shaft bears a second ring of clutch teeth,
    said clutch sleeve bears a third ring of clutch teeth, and
    wherein said movement of said clutch sleeve axially into clutching engagement brings said third ring of clutch teeth simultaneously into engagement with said first and said second rings of clutch teeth.

4. An electro-hydraulic servo valve assembly for regulating the amount or pressure of hydraulic fluid supplied to a hydraulically operated machine system comprising
    an electric motor,
    a feedback signal generator,
    a motor controller for comparing an input command signal with a feedback signal produced by said generator to produce a motor control signal,
    means coupling motor control signal to said electric motor comprising,
    a rotary shaft,
    means for driving said feedback signal generator from said rotary shaft,
    a worm wheel rotatable on said rotary shaft,
    a worm driven by said electric motor meshing with said worm wheel,
    a movable valve member,
    coupling means converting rotary motion of said shaft to rectilinear motion of said movable valve member,
    a clutch sleeve surrounding said shaft and slidable axially along said shaft to clutch said shaft to and unclutch said shaft from said worm wheel,
    spring means urging said clutch sleeve into clutching engagement,
    a trunnion mounted on an end of said clutch sleeve, and
    a manual operation handle mounted on said trunnion beyond one end of said shaft for rotating said shaft when said shaft is unclutched from said worm wheel,
    said handle being pivotally mounted to swing on said trunnion about an axis at right angles to said shaft axis from a first position in which said handle is disconnected from said shaft to a second position in which said handle is engaged with said shaft to rotate it, and
    cam means being provided on said handle whereby said clutch sleeve is cammed axially out of clutching engagement against the action of said spring when said handle is swung into said second position.

5. A combination according to claim 4 wherein the end of said shaft has a slot in which said handle engages when swung into said second position, whereby said handle and said shaft can only be mutually engaged in one relative angular position of said handle and said shaft about the shaft axis.

6. A combination according to claim 4 wherein said worm wheel bears a first ring of clutch teeth,
said shaft bears a second ring of clutch teeth,
said clutch sleeve bears a third ring of clutch teeth, and
wherein said movement of said clutch sleeve axially into clutching engagement brings said third ring of clutch teeth simultaneously into engagement with said first and said second rings of clutch teeth.

* * * * *